United States Patent
Kinthada Venkata et al.

(10) Patent No.: US 9,967,766 B2
(45) Date of Patent: May 8, 2018

(54) METHODS AND APPARATUS FOR ADAPTIVE MEASUREMENT CONFIGURATION SELECTION IN A VEHICULAR DEVICE

(71) Applicant: QUALCOMM Incorporated, San Diego, CA (US)

(72) Inventors: Madhusudan Kinthada Venkata, San Diego, CA (US); Srinivasan Balasubramanian, San Diego, CA (US); Manjinder Singh Sandhu, Poway, CA (US); Abhinav Dayal, Milpitas, CA (US); Siva Kumar Jujaray, San Diego, CA (US); Raj Surya Pratha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/056,176

(22) Filed: Feb. 29, 2016

(65) Prior Publication Data

US 2017/0251391 A1     Aug. 31, 2017

(51) Int. Cl.
*H04W 24/10*     (2009.01)
*H04L 29/08*     (2006.01)
(Continued)

(52) U.S. Cl.
CPC .......... *H04W 24/10* (2013.01); *H04B 7/0802* (2013.01); *H04B 7/0868* (2013.01);
(Continued)

(58) Field of Classification Search
CPC .................................................. H04W 24/10
See application file for complete search history.

(56) References Cited

U.S. PATENT DOCUMENTS 6,018,651 A    1/2000    Bruckert et al.
6,330,433 B1   12/2001   Jager
(Continued)

FOREIGN PATENT DOCUMENTS

EP     0573856 A1    12/1993
EP     0798878 A2    10/1997
(Continued)

OTHER PUBLICATIONS

International Search Report and Written Opinion—PCT/US2017/017854—ISA/EPO—dated May 8, 2017.

*Primary Examiner* — Gerald A Smarth
(74) *Attorney, Agent, or Firm* — Patterson & Sheridan, L.L.P.

(57) ABSTRACT

Certain aspects of the present disclosure relate to methods and apparatus for adaptive antenna switching for measurements, for example, in high gain automotive devices. According to certain aspects, a method is provided herein for wireless communications. The method generally includes selecting, based on one or more conditions, a first measurement configuration that uses at least an external antenna mounted on a surface of a vehicle for one or more measurements or a second measurement configuration that uses at least an internal antenna associated with the vehicle for the one or more measurements; performing the one or more measurements using the selected measurement configuration; and sending a report based on the one or more measurements. The techniques for measurement configuration selection may allow the device to achieve the benefits of both the high gain external antenna and the lower gain internal antenna(s) depending on the current conditions.

29 Claims, 11 Drawing Sheets

(51) Int. Cl.
*H04W 36/00* (2009.01)
*H04B 7/08* (2006.01)

(52) U.S. Cl.
CPC ......... *H04L 67/12* (2013.01); *H04W 36/0088* (2013.01); *H04W 36/0083* (2013.01)

(56) References Cited

U.S. PATENT DOCUMENTS

| | | | | |
|---|---|---|---|---|
| 7,724,808 | B2* | 5/2010 | Reial | H04B 1/7113 375/150 |
| 8,064,959 | B2 | 11/2011 | Forrester | |
| 8,676,252 | B2* | 3/2014 | Noh | H04L 12/66 370/228 |
| 9,002,015 | B2* | 4/2015 | Fong | H04L 5/0053 370/328 |
| 9,344,909 | B2* | 5/2016 | Seo | H04L 1/20 |
| 9,374,665 | B2* | 6/2016 | Johansson | H04W 64/003 |
| 9,635,621 | B2* | 4/2017 | Papasakellariou | H04W 52/244 |
| 2006/0073829 | A1 | 4/2006 | Cho et al. | |
| 2013/0237294 | A1 | 9/2013 | Periyalwar et al. | |

FOREIGN PATENT DOCUMENTS

| | | | |
|---|---|---|---|
| EP | 2182754 | A1 | 5/2010 |
| WO | WO-2016086072 | A1 | 6/2016 |

\* cited by examiner

METHODS AND APPARATUS FOR ADAPTIVE MEASUREMENT CONFIGURATION SELECTION IN A VEHICULAR DEVICE

BACKGROUND

Field of the Disclosure

The present disclosure relates generally to wireless communication and, more particularly, to methods and apparatus for adaptive measurement configuration selection in a vehicular device, for example, an automotive device having a high-gain antenna.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A high gain antenna can be used to provide wireless connectivity to vehicular devices, such as automotive devices like automobiles. In some aspects, the automotive devices are generally considered wireless terminals (e.g., or user equipments (UEs)) and can communicate with base stations (BSs) as they drive within coverage of the BSs. Although, there may be benefits realized by using the external antenna, there may be scenarios where using the external antenna is not desired.

Accordingly, techniques for selecting when to use the high-gain antenna for these types of vehicular devices are desirable.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

The present disclosure relates generally to wireless communication, and more particularly, to methods and apparatus for adaptive measurement configuration selection, for example, in a vehicular device such as an automotive device having a high-gain antenna.

Certain aspects of the present disclosure provide a method for wireless communications. The method generally includes selecting, based on one or more conditions, a first measurement configuration that uses at least an external antenna mounted on a surface of a vehicle for one or more measurements or a second measurement configuration that uses at least an internal antenna associated with the vehicle for the one or more measurements; performing the one or more measurements using the selected measurement configuration; and sending a report based on the one or more measurements.

Certain aspects of the present disclosure provide an apparatus for wireless communications. The apparatus generally includes means for selecting, based on one or more conditions, a first measurement configuration that uses at least an external antenna mounted on a surface of a vehicle for one or more measurements or a second measurement configuration that uses at least an internal antenna associated with the vehicle for the one or more measurements; means for performing the one or more measurements using the selected measurement configuration; and means for sending a report based on the one or more measurements.

Certain aspects of the present disclosure provide an apparatus for wireless communications. The apparatus generally includes at least one processor configured to select, based on one or more conditions, a first measurement configuration that uses at least an external antenna mounted on a surface of a vehicle for one or more measurements or a second measurement configuration that uses at least an internal antenna associated with the vehicle for the one or more measurements; perform the one or more measurements using the selected measurement configuration; and output a report for transmission based on the one or more measurements; and a memory coupled with the at least one processor.

Certain aspects of the present disclosure provide a computer readable medium having computer executable code thereon. The computer executable code generally includes code for selecting, based on one or more conditions, a first measurement configuration that uses at least an external antenna mounted on a surface of a vehicle for one or more measurements or a second measurement configuration that uses at least an internal antenna associated with the vehicle for the one or more measurements; code for performing the one or more measurements using the selected measurement configuration; and code for sending a report based on the one or more measurements.

Other aspects, features, and aspects of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the invention disclosure herein. In similar fashion, while exemplary aspects may be discussed below as device, system, or method aspects it should be understood that such exemplary aspects can be implemented in various devices, systems, methods, and computer readable media.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
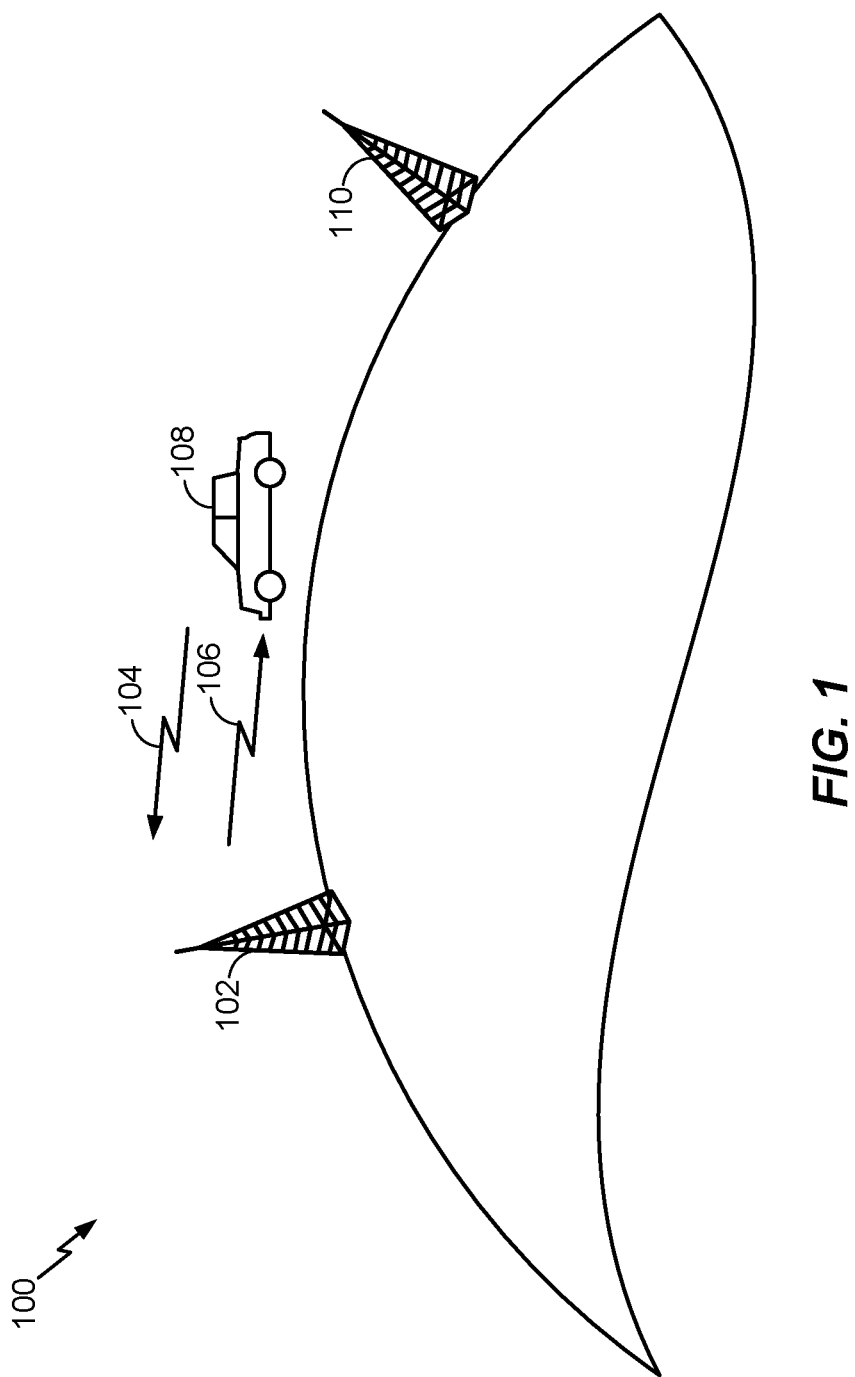
FIG. 1 is a block diagram illustrating a communications system including an automotive device equipped with a high gain external antenna, in accordance with certain aspects of the present disclosure.

Antennas may be used on vehicles (e.g., or other devices) to enable wireless communications between one or more components of the vehicle and other devices in the area, and/or to enable wireless communications for devices within the vehicle to communicate with other devices. In one example, one or more external antennas may be used on top of a vehicle, such as an automobile. The one or more external antennas may have high gain. Due to the high gain, vehicular antennas may sustain a call for longer periods of time than, for example, smartphones when traveling out of coverage (e.g., cell edge scnearios). While high gain antennas may have benefits, there may also be scenarios for which it is preferable not to use the high gain external antenna. In certain aspects of the present disclosure, a vehicular device not only includes an external antenna but also includes one or more internal antennas.

Aspects of the present disclosure discuss techniques for adaptive configuration (e.g., antenna switching), for example, for measurements in high gain automotive devices. For example, based on particular conditions or triggers, the device may dynamically select between measurements configurations that use an internal lower gain antenna, the external high gain antenna, or both antennas. Thus, the device may be able to select the appropriate configuration based on the current conditions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspect. Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA technique has similar performance and essentially the same overall complexity as those of an OFDMA system. However, an SC-FDMA signal has a lower peak-to-average power ratio (PAPR) because of its inherent single carrier structure. The SC-FDMA technique has drawn great attention, especially in the uplink communications where lower PAPR greatly benefits the mobile terminal in terms of transmit power efficiency. Use of SC-FDMA is currently a working assumption for uplink multiple access scheme in the 3GPP LTE and the Evolved UTRA.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later.

An Example Wireless Communication System

FIG. 1 illustrates an example system 100 in which aspects of the present disclosure may be utilized. For example, the vehicular transceiver 108 may select, based on one or more conditions, a first measurement configuration that uses at least an external antenna mounted on a surface of a vehicle for one or more measurements or a second measurement configuration that uses at least an internal antenna for the one or more measurements. The vehicular transceiver 108 can perform the one or more measurements using the selected measurement configuration and send a report based on the one or more measurements.

In one aspect, the system includes one or more base stations 102 and 110 that transmits and receive signals using a forward link (FL) 104 and a reverse link (RL) 106. A vehicular transceiver (VT) 108 (e.g., such as an automobile), which may be considered a user equipment (UE), in communication with the base station 102 may also transmit and receive signals using the forward link 104 and reverse link 106. In one aspect, the vehicular transceiver 108 may include at least one high gain external antenna and at least one lower gain internal antenna(s). The high gain vehicular antenna may be mounted in any suitable location, for example, on a top surface of an automobile. Another base station 110 is also shown.

Figure 2:
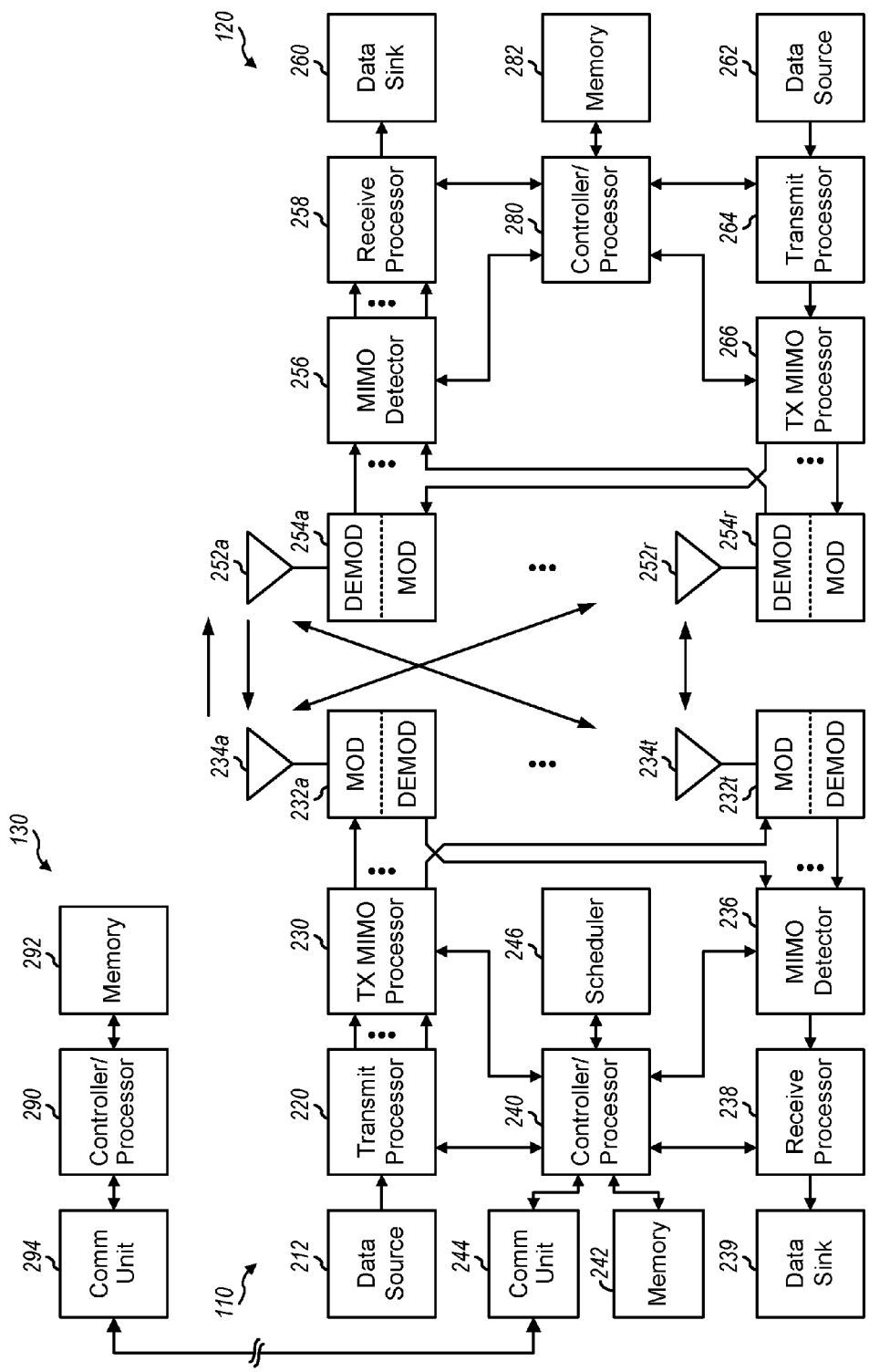
FIG. 2 illustrates a block diagram of a base station (BS) and a user equipment (UE), in accordance with certain aspects of the present disclosure.

FIG. 2 illustrates example components of the base station/eNB 110 (e.g., such as the BS 102, 110 illustrated in FIG. 1) and VT/UE 120 (e.g., such as the VT 108 illustrated in illustrated in FIG. 1), in which LTE-based communications may be used to implement the system. In aspects, other radio access technologies (RATs) may be used for communications between the vehicular transceiver and BSs.

FIG. 2 illustrates a block diagram of one example of base station 110 and a user equipment 120 (e.g., which may be a vehicular transceiver) in a multiple-input multiple-output (MIMO) system. Transmitter system 210 and receiver system 250 may be examples of the present disclosure, according to certain aspects.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. The antennas 252a-252r may include one or more high gain external antenna(s) and one or more lower gain internal antenna(s). Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A temperature sensor 284 (e.g., a thermocouple) may sense a temperature (e.g., an ambient temperature or a temperature of the UE) and supply information regarding the temperature to the controller/processor, receive processor, and/or transmit processor. The controller/processor may store information regarding the operation of a crystal oscillator (e.g., a crystal oscillator in a demodulator) at the temperature in memory 282. While receiving a signal, the controller/processor and/or receive processor may use information regarding the operation of the crystal oscillator and the temperature in determining a precision of the crystal oscillator. A channel processor may determine reference signal received power (RSRP), received signal strength indicator (RSSI), reference signal received quality (RSRQ), and/or CQI, etc.

On the uplink, at UE 120, a transmit processor 264 may receive and process data from a data source 262 and control information (e.g., for reports based on and/or comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. Memories 242 and 282 may store data and program codes for BS 110 and UE 120, respectively. A scheduler 246 may schedule UEs for data transmission on the downlink and/or uplink. The controller/processor 280 and/or other processors, components and/or modules at the UE 120 may perform or direct operations, for example, operations 600 in FIG. 6, and/or other processes for the techniques described herein for adaptive measurement configuration selection in a vehicular device. In certain aspects, one or more of any of the components shown in FIG. 6 may be employed to perform example operations 600, and/or other processes for the techniques described herein.

Figure 3:
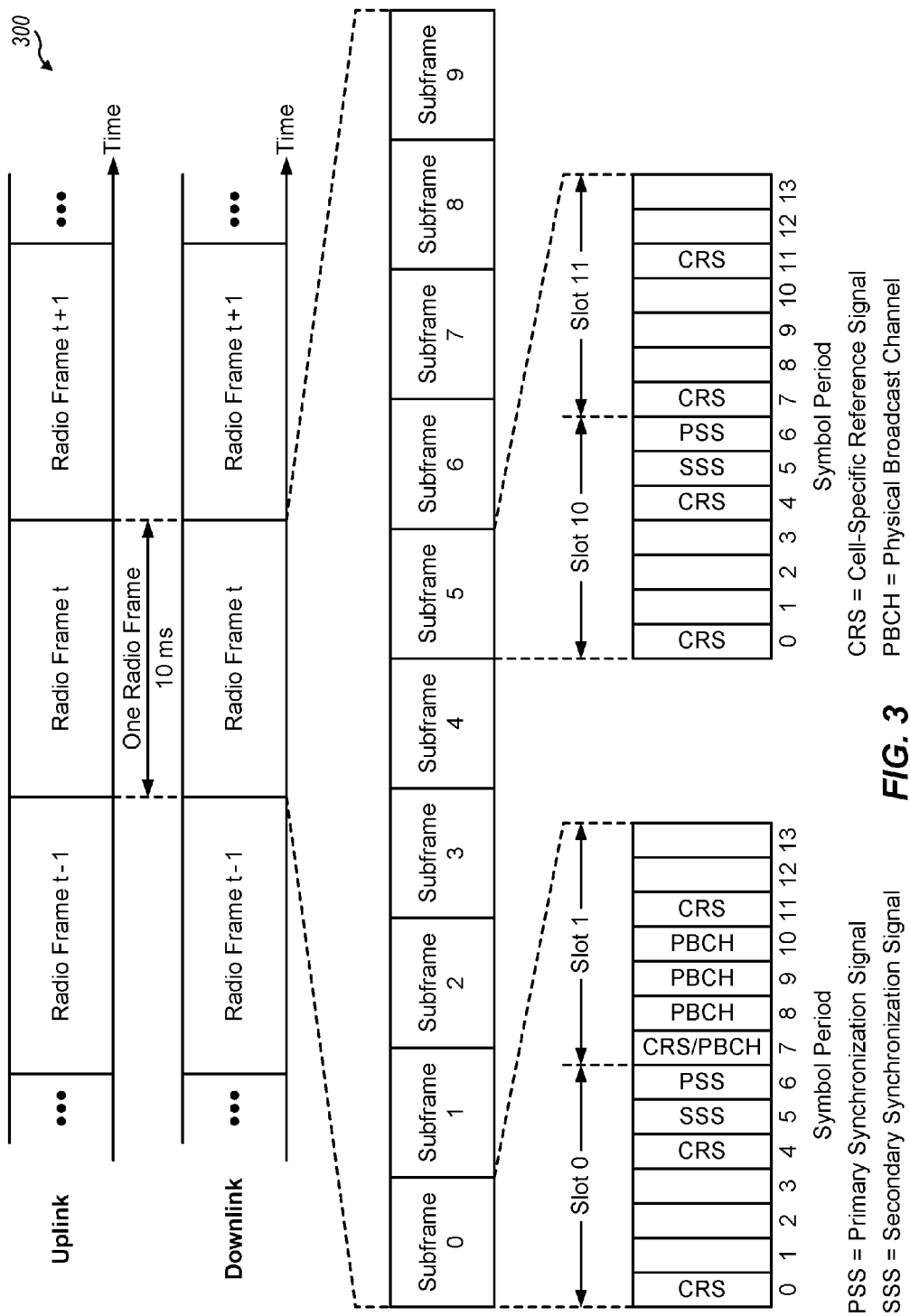
FIG. 3 is a block diagram conceptually illustrating an example of frame structure in a telecommunications system.

FIG. 3 shows an exemplary frame structure 300 for FDD in LTE. The transmission timeline for each of the downlink and uplink may be partitioned into units of radio frames. Each radio frame may have a predetermined duration (e.g., 10 ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. For example, the PSS may provide the UE with information regarding the physical layer identity (e.g., 0 to 2) of an LTE cell. An LTE cell belongs to one of three groups of physical layer cell identities, and the physical layer identity may indicate which group. The PSS may also be used by the UE in symbol timing detection, frequency offset detection, etc. The SSS may provide the UE with information regarding the physical layer cell identity group number (e.g., 0 to 167) and may be used by the UE for radio frame timing detection, cyclic prefix length detection, time division duplexing (TDD)/frequency division duplexing (FDD) detection, etc.

With the physical layer identity (e.g., from PSS) and the physical layer cell identity group number (e.g., from SSS), the UE may determine the physical layer cell identity (PCI) for a given cell. Once the UE knows the PCI for a given cell, as described below, the UE may know the location of reference signals transmitted from the cell and may be able to receive and decode system information (e.g., used for acquiring the cell) transmitted from the cell.

The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames.

The PBCH may carry some system information (e.g., the master information block (MIB)) that, in general, may be used by UEs for initial access to the cell, and the like. For example, the PBCH may carry information regarding system bandwidth, number of transmit antennas, system frame number, etc. The eNB may also transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
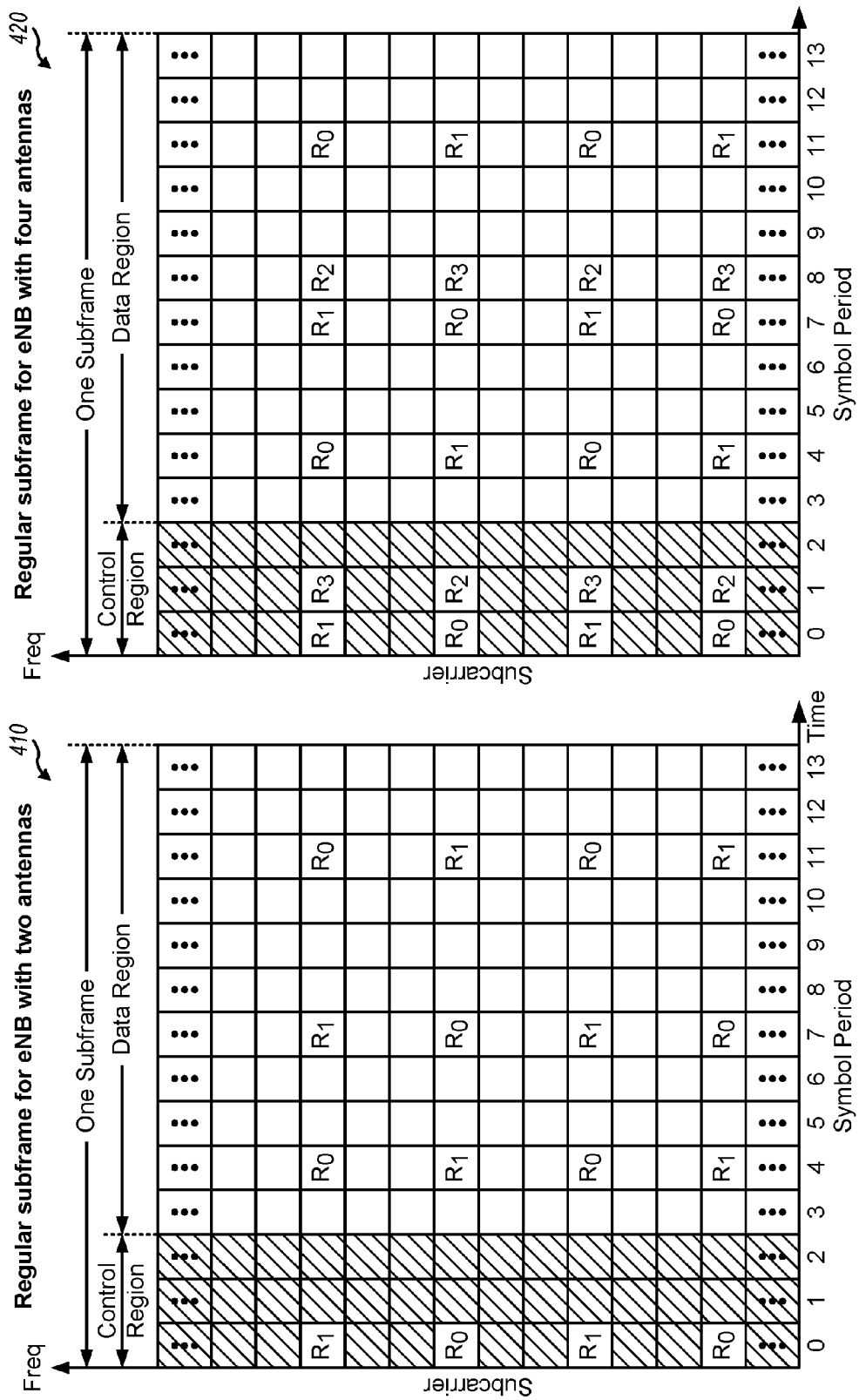
FIG. 4 illustrates an example subframe resource element mapping, according to aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value. Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example Adaptive Measurement Configuration Selection in a Vehicular Device

As described above, one or more external high gain vehicular antennas may be used on vehicles, such as the vehicular transceiver 108 (e.g., or other devices). In some cases, the one or more antennas may provide for long term evolution (LTE) communications between the vehicle and a network. In other cases, other radio access technologies (RATs) may be used for the communications. In one example, one or more external antennas may be used on top of a vehicle, such as automobile. These one or more external antennas may have high gain. Due to the high gain, vehicular antennas may sustain a call for longer periods of time than, for example, smartphones when traveling out of coverage (e.g., cell edge scnearios). Higher gain may translate to lower transmit power and, thus, to reduced power consumption and device heating, etc.

Due to the high gain, the vehicles with one or more high gain external antennas may remain on the cell for a longer duration and reselection may not be triggered, or may be delayed. Inter-radio access technology (IRAT) and/or single radio voice call continuity (SRVCC) failures may occur at border areas. Also, public land mobile network (PLMN) cell dragging issues may occur when traveling across countries, in one example, crossing the U.S./Canada border. Since the high gain allows the vehicle to remain on the cell longer, even after crossing the border, the vehicle may remain on the network, for example, instead of roaming. In some cases, even though the vehicle is able to remain camped on the cell (e.g., still meets the cell selection criteria), the vehicle may not be able to complete uplink transmissions. For example, the reference signal receive power (RSRP) may be good (e.g., because of the high-gain antenna), although the reference signal receive quality (RSRQ) is not good.

Figure 5:
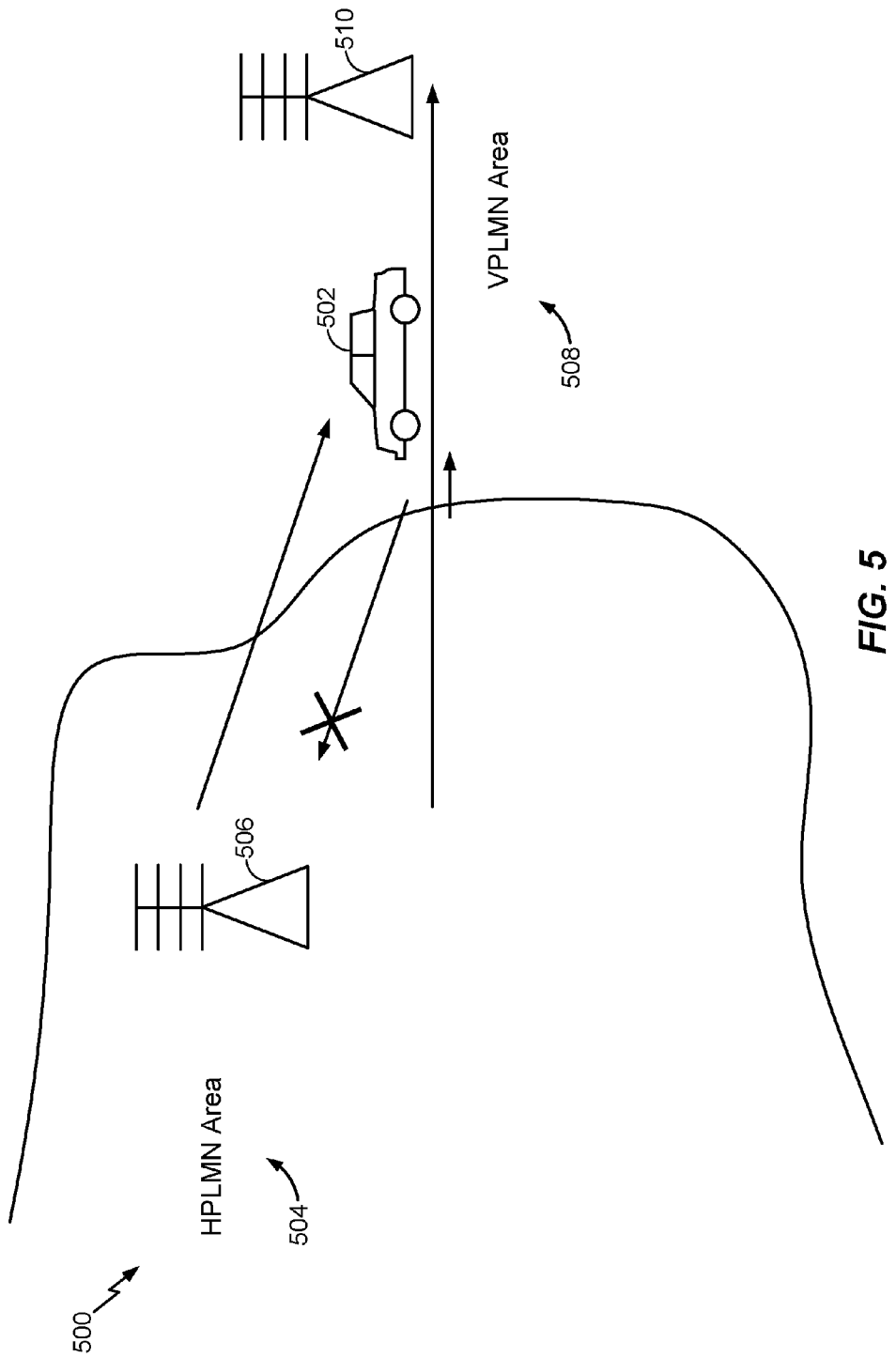
FIG. 5 is an example diagram illustrating downlink uplink mismatch and/or cell dragging when a vehicle with a high gain external travels at cell edge.

FIG. 5 is an example diagram illustrating downlink uplink mismatch and cell dragging when a vehicle with a high gain external travels at cell edge. As shown in FIG. 5, the vehicle 502 may be camped on the cell 506 in the HPLMN 504. As shown, the vehicle 502 may leave the HPLMN area 504 and enter the VPLMN area 508, but may remain camped on the cell 506, even though the cell 510 in the VPLMN area 508 may be better (e.g., closer). As shown in FIG. 5, although the vehicle 502 is able to stay camped on the cell 506 for the downlink, uplink transmissions from the vehicle 502 to the cell 506 may fail (e.g., as represented by the "X" on the arrow going from the vehicle 502 to the cell 506).

In other words, the one or more high gain vehicular antennas may improve coverage and/or call success rate at cell edge scenarios, reduce uplink power requirements (e.g., saving battery and/or reducing heating), improve throughput due to high channel quality information (CQI) reports, and improve voice over long term evolution (VoLTE) call quality due to high signal to noise ratio (SNR) getting the device a higher rate codec; but, in scenarios may create uplink downlink imbalance which may lead to uplink failures, lead to SRVCC failures due to the device not reporting measurements in time for IRAT handover, lead to border PLMN cell dragging where the device is still on the home PLMN but cannot complete calls when deep into the visiting PLMN area (e.g., due to downlink uplink imbalance), and/or can lead to uplink failures such as in underground parking where there is a large attenuation but the device is still on the weak LTE cell due to marginal pass in LTE downlink cell selection.

Accordingly, techniques for switching between configurations, for example, measurement configurations that use a high gain external antenna and/or a lower gain internal antenna to avoid some of the issues discussed above are desirable.

Techniques and apparatus are provided herein for adaptive measurement configuration selection and antenna switching for measurements in vehicular device, such as high gain automotive devices. For example, by monitoring for various conditions/triggers, the device can determine whether to perform measurements using an external antenna, internal antenna, or both depending on the various conditions/triggers.

Figure 6:
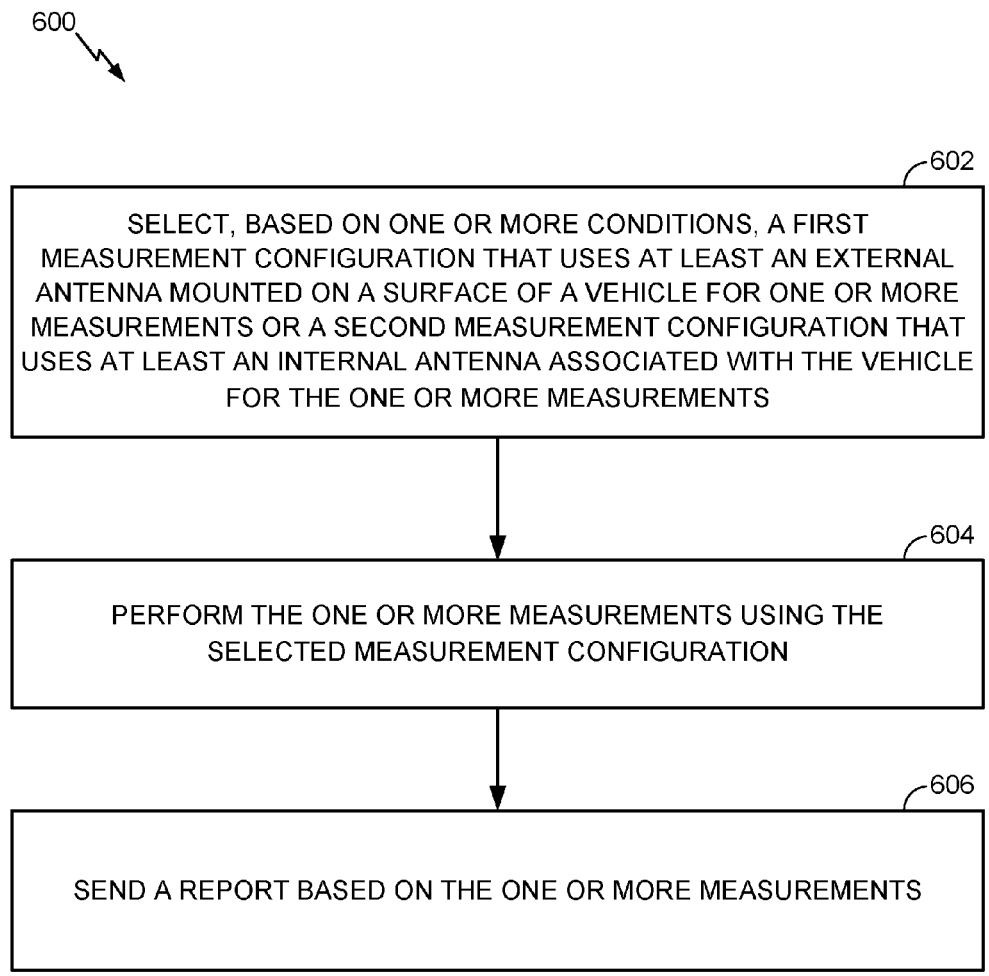
FIG. 6 is an example flow diagram illustrating example operations for adaptive configuration (e.g., antenna configuration via antenna switching), for example, for measurements in vehicular devices having a high-gain antenna, in accordance with certain aspects of the present disclosure.

FIG. 6 is an example flow diagram illustrating example operations 600 for adaptive configuration (e.g., antenna configuration via antenna switching), for example for measurements in high gain automotive devices (e.g., such as vehicular transceiver 108), in accordance with aspects of the present disclosure. The operations 600 may begin, at 602, by selecting, based on one or more conditions, a first measurement configuration that uses at least an external antenna mounted on a surface of a vehicle for one or more measurements or a second measurement configuration that uses at least an internal antenna associated with the vehicle for the one or more measurements. At the 604, the device performs the one or more measurements using the selected measurement configuration. At 606, the device sends a report based on the one or more measurements.

According to certain aspects, a measurement configuration may include which antennas are used to perform measurements, which antennas may be deactivated or set to a low power mode, and/or what types of measurements are being performed by the antennas. The antennas can include a high-gain external antenna, for example, mounted to a vehicle such as on the top surface of an automobile, and/or a lower gain antenna, for example, which may be an internal antenna (e.g., internal to the device, such as located somewhere within the vehicle). Measurements can include signal and/or mobility measurements, for example, related to reporting for handover and/or cell selection or reselection.

According to certain aspects, the techniques described herein may be applicable to selection of measurement configurations that use antennas having a wide variety of gain, and, which may be applicable to a wide variety of different vehicular devices.

As will be described in further detail below, the selection of the measurement configuration can be based on various conditions, for example, one or more predefined triggers related to which configuration should be used. For example, a measurement configuration that uses the internal antenna for handover/cell selection related measurements may be selected when use of the external antenna might lead to one of the issues described above (e.g., cell dragging, uplink failure, SRVCC failure, and/or call failure underground, etc.).

According to certain aspects, the device (e.g., a vehicle having an external high gain antenna and a lower (e.g., low) gain internal antenna(s)), may operate according to a first configuration (e.g., measurement configuration) and/or a default measurement configuration. For example, the device may use the external antenna, for example, for measurements and the internal antenna(s) may be deactivated. For example, this may allow the device to achieve the benefits described above (e.g., such as improved coverage, reduced heating, battery savings, improved call quality, and/or improved call success at cell edge, etc.). Upon detecting a "trigger" condition, the device may switch to a second configuration (e.g., a second measurement configuration) that uses one or more internal antennas, for example, for the measurements (or that uses both the external and internal antennas).

As will be described in more detail below, the antenna switching may be accomplished using a hardware and/or software switch (e.g., a radio frequency (RF) switch) between the internal and external antenna(s), and/or can be accomplished using a separate RF chain (e.g., narrowband or wideband) for the external and internal measurements.

According to certain aspects, both the one or more external and the one or more internal antennas may be used for measurements. In one example implementation, the device may only report measurements for cells seen by both the external and internal antenna. As an illustrative example, if the external measures cells a1, a2, a3, a4 with reference signal receive power (RSRP) r1, r2, r3, and r4, respectively, and the internal measures cells a1, a2 with RSRP rr1, rr2, respectively, then the device may only report measurements for the cells a1 and a2. According to certain aspects, when the external and internal antenna(s) are used, the device may find the difference between the measurements using the external and internal antenna and may apply an offset when reporting the measurements (e.g., measurements on the serving and/or neighbor cells).

According to certain aspects, although the internal antenna(a) may be deactivated for certain measurement configurations that use the external antenna, the external antenna may not be deactivated, even for measurement configurations that use the internal antenna(s) for the mobility related measurements. For example, channel state information, channel quality information (CQI) and/or rank indicator (RI) measurements may be performed using the external antenna, regardless of which measurement configuration is selected. Additionally or alternatively, uplink transmissions and/or downlink demodulation may also be performed using the external antenna, regardless of which measurement configuration is selected.

Example RSRQ-Based Switching

According to certain aspects, one condition (e.g., trigger) that can be used for measurement configuration selection is reference signal receive quality (RSRQ). For example, if the RSRQ fails to satisfy is below (e.g., is below) a first threshold criteria or value (threshold s) for the RSRQ, then the can switch to (e.g., select) a measurement configuration using the internal antenna, for example, for the handover/cell selection related measurements and reporting. If the RSRQ satisfies (e.g., exceeds) a second threshold criteria or value (threshold sb), then the device may switch back to (e.g., select) a measurement configuration using the external antenna (e.g., the default configuration).

The first and second threshold values may be different values, for example, to provide a hysteresis for the switching and prevent toggling between configurations. Time hysteresis may also be employed along with signal level hysteresis to prevent toggling between configurations.

Figure 7:
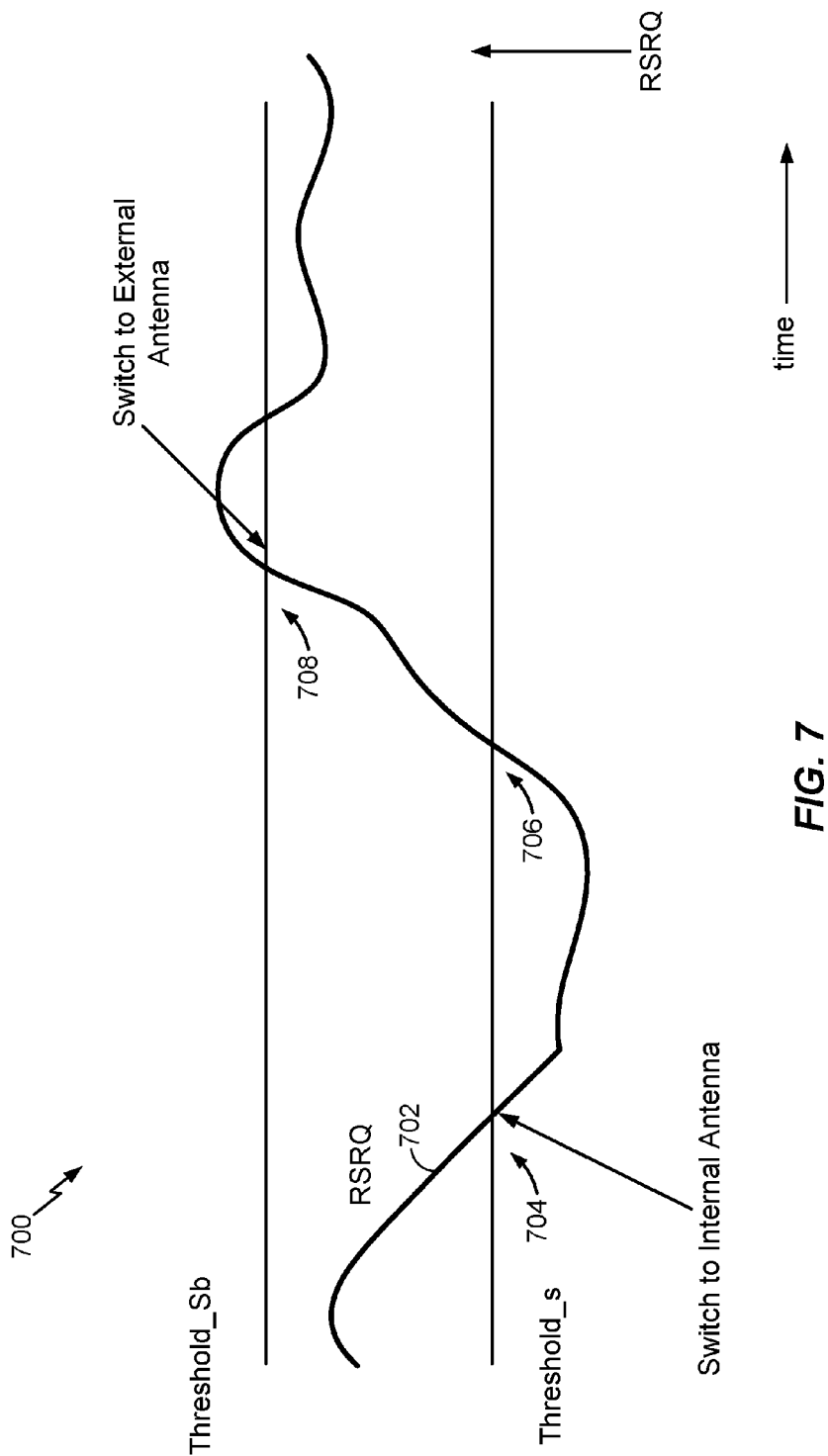
FIG. 7 is an example graph illustrating reference signal receive quality (RSRQ) over time and adaptive configuration for measurements (e.g., via antenna switching), for example, based on the RSRQ, in accordance with certain aspects of the present disclosure.

FIG. 7 is an example graph 700 illustrating RSRQ over time and adaptive configuration for measurements (e.g., via antenna switching) based on the RSRQ, in accordance with certain aspects of the present disclosure. In FIG. 7, the curve 702 may represent the RSRQ over time. As shown in FIG. 7, at 704, the RSRQ falls below the threshold s. At this point, the device may use the internal antenna for the measurements. At 706, the RSRQ may go above the threshold s, but the device does not change measurement/antenna configuration until the RSRQ exceeds the threshold sb at 708. At that point, the device switches back to a configuration using the external antenna.

Example Uplink Power-Based Switching

Additionally or alternatively, according to certain aspects, one condition (e.g., trigger) that can be used for measurement configuration selection is uplink power (e.g., physical uplink shared channel (PUSCH) transmit power). For example, the device may identify an uplink downlink imbalance. In one example, if the device is uplink power limited and/or has a high uplink block error rate (BLER), the device may switch to (e.g., select) a configuration that uses the internal antenna(s) for the signal and/or mobility related measurements. In aspects, the device may be able to find a better cell and/or RAT using the internal antenna. If the uplink power and/or BLER improves, the device may switch back to a configuration that uses the external antenna for the measurements.

Figure 8:
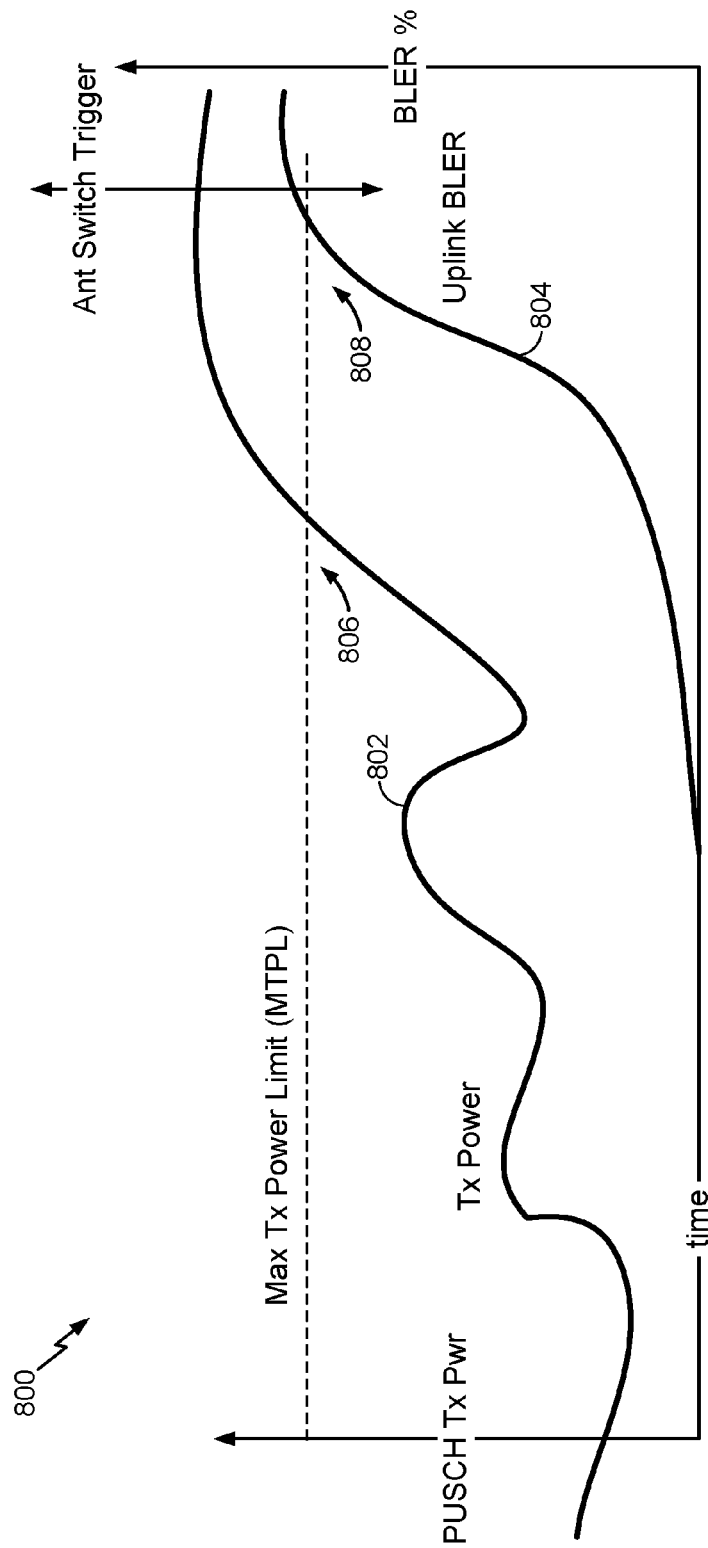
FIG. 8 is an example graph illustrating transmission power and block error rate (BLER) over time and adaptive configuration for measurements (e.g., via antenna switching), for example, based on the transmission power and BLER, in accordance with certain aspects of the present disclosure.

FIG. 8 is an example graph 800 illustrating uplink transmission power and BLER over time and adaptive configuration for measurements (e.g., via antenna switching) based on the uplink transmission power and BLER, in accordance with certain aspects of the present disclosure. In FIG. 8, the curve 802 may represent the PUSCH transmission power over time and the curve 1004 may illustrate the uplink BLER over time. As shown in FIG. 8, at 806, the PUSCH transmit power may exceed the max transmit power limit and at 808 the BLER may reach a threshold. At this point, for example, the device may use the internal antenna for the measurements.

Example RACH Failure-Based Switching

According to certain aspects, one condition (e.g., trigger) that can be used for measurement configuration selection is random access channel (RACH) failure. For example, after a number of failed RACH attempts or a duration of attempting, the device switch to (e.g., select) a configuration using the internal antenna. In one example implementation, the device may have a timer (e.g., a T300 timer) associated with the RACH attempts and a counter that count a number of consecutive times that the timer expires without a successful RACH attempt. If the number of times satisfies a threshold number of tries, n, and the device has VPLMN cells in its database, then the device may switch to the internal antenna. If the internal antenna also fails its RACH attempts, the device fall back to one of the VPLMN cells. According to certain aspects, the device may switch back to a measurement configuration using the external antenna for the mobility related measurements once the RACH succeeds.

Example Configuration Selection

Additionally or alternatively, according to certain aspects, the configuration selection (e.g., antenna switching) may be accomplished using hardware and/or software (e.g., a RF switch) between the internal and external antenna, or can be accomplished using a separate RF chain (e.g., narrowband or wideband) for the external and internal measurements.

Figure 9:
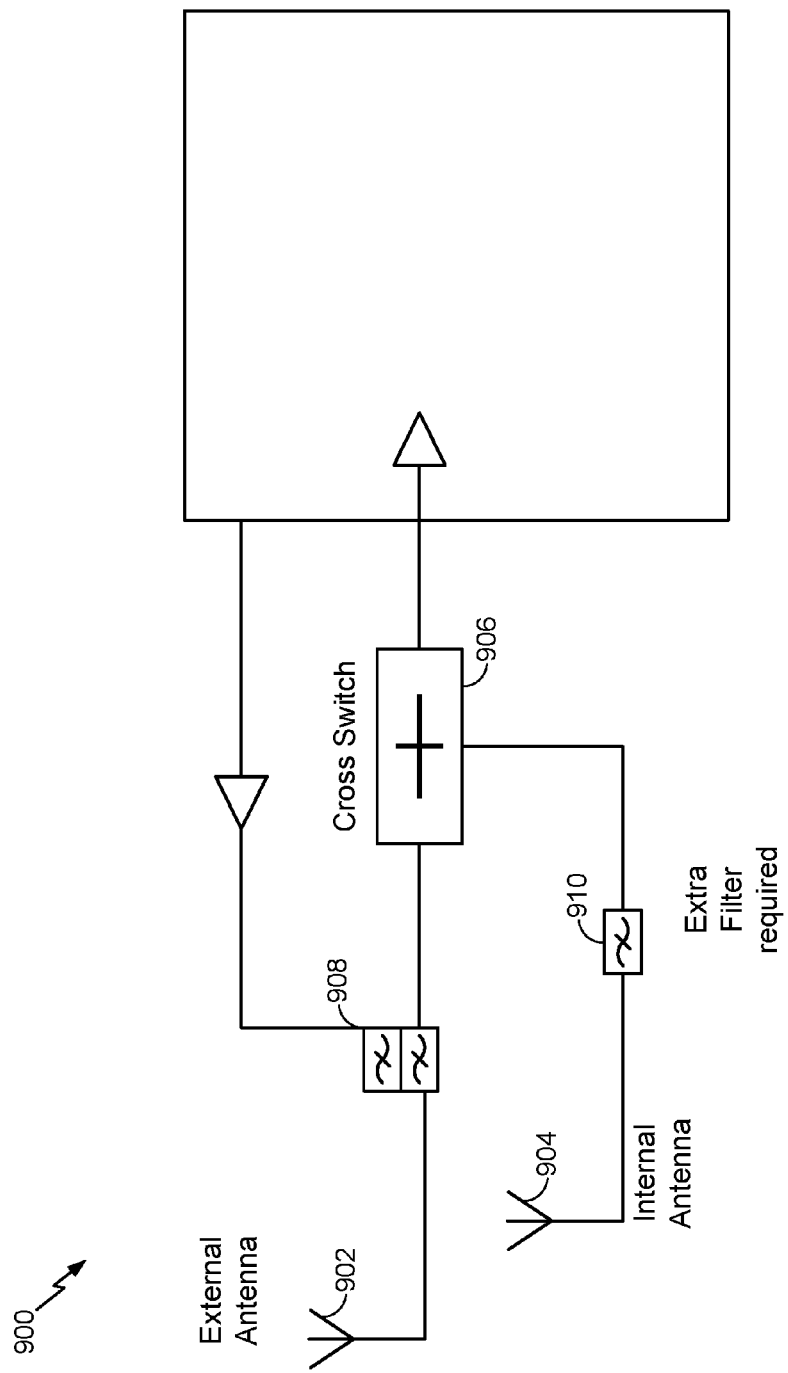
FIG. 9 is a block diagram illustrating an antenna switch hardware and/or software after the duplexer on the reception path, in accordance with certain aspects of the present disclosure.

FIG. 9 is a block diagram illustrating a configuration 900 of an antenna switch hardware and/or software after the duplexer on the reception path, in accordance with certain aspects of the present disclosure. In FIG. 9, the switch may be between the one or more external antennas and the one or more internal antennas. For example, as shown in FIG. 9, the switch 906 may be in between the one or more external antennas 902 and one or more internal antennas 904. The switch 906 may be after the duplexer 908 on the reception path. For this switching configuration, an additional receive filter 910 may be used.

Figure 10:
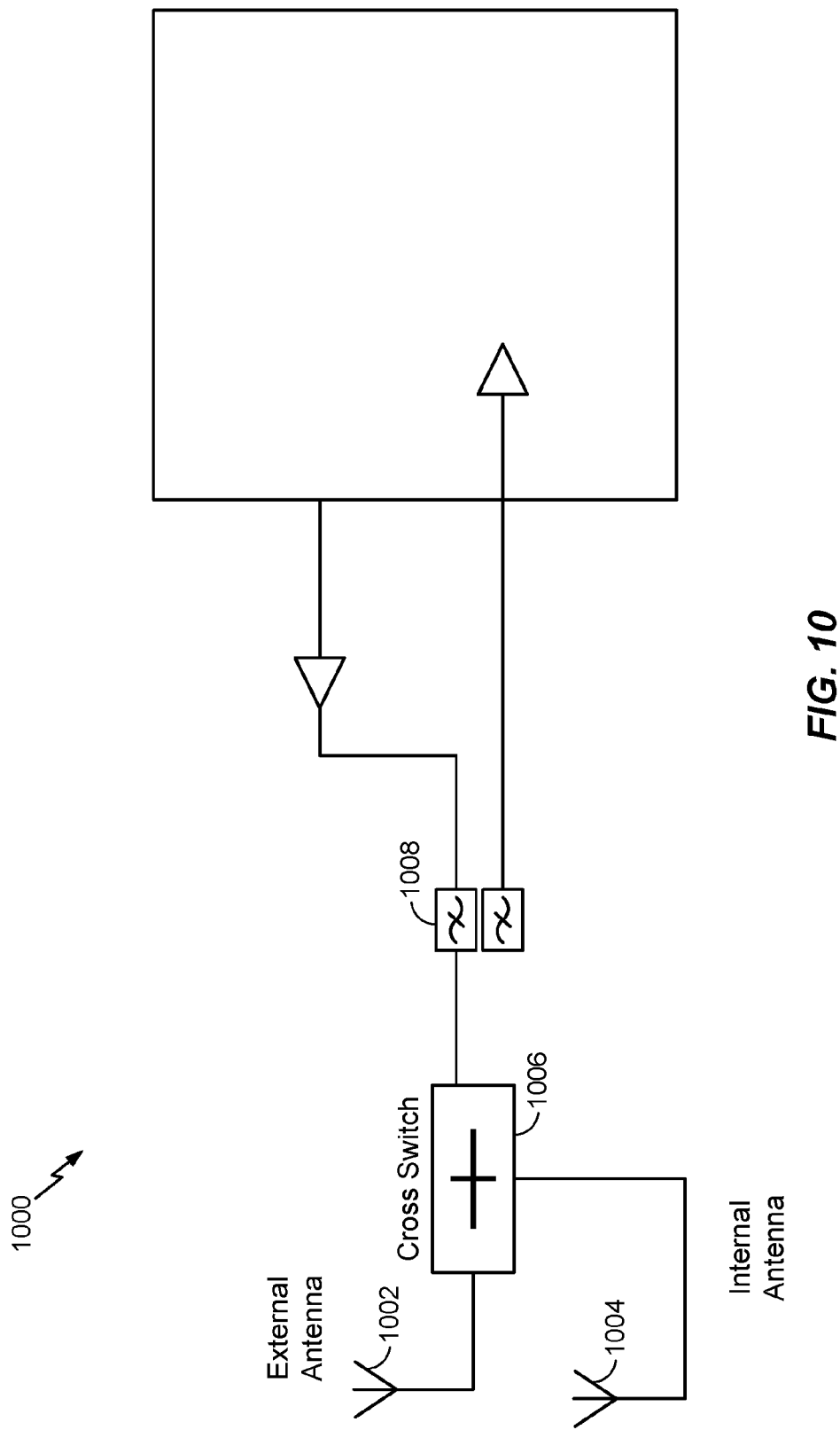
FIG. 10 is a block diagram illustrating an antenna switch hardware and/or software before the duplexer, in accordance with certain aspects of the present disclosure.

FIG. 10 is a block diagram illustrating a configuration 1000 of an antenna switch hardware and/or software before the duplexer, in accordance with certain aspects of the present disclosure. For example, as shown in FIG. 10, the switch 1006 may be in between the one or more external antenna 1002 and one or more internal antenna 1004. The switch 1006 may be before the duplexer 1008 on the reception path. For this switching configuration, an additional receive filter may not be used.

In some cases, transmission may be disrupted due to the antenna switching. The device may boost the transmit power when the switch is made to the internal antenna and can revert back to the lower transmission power if the devices switches back to the external antenna.

Figure 11:
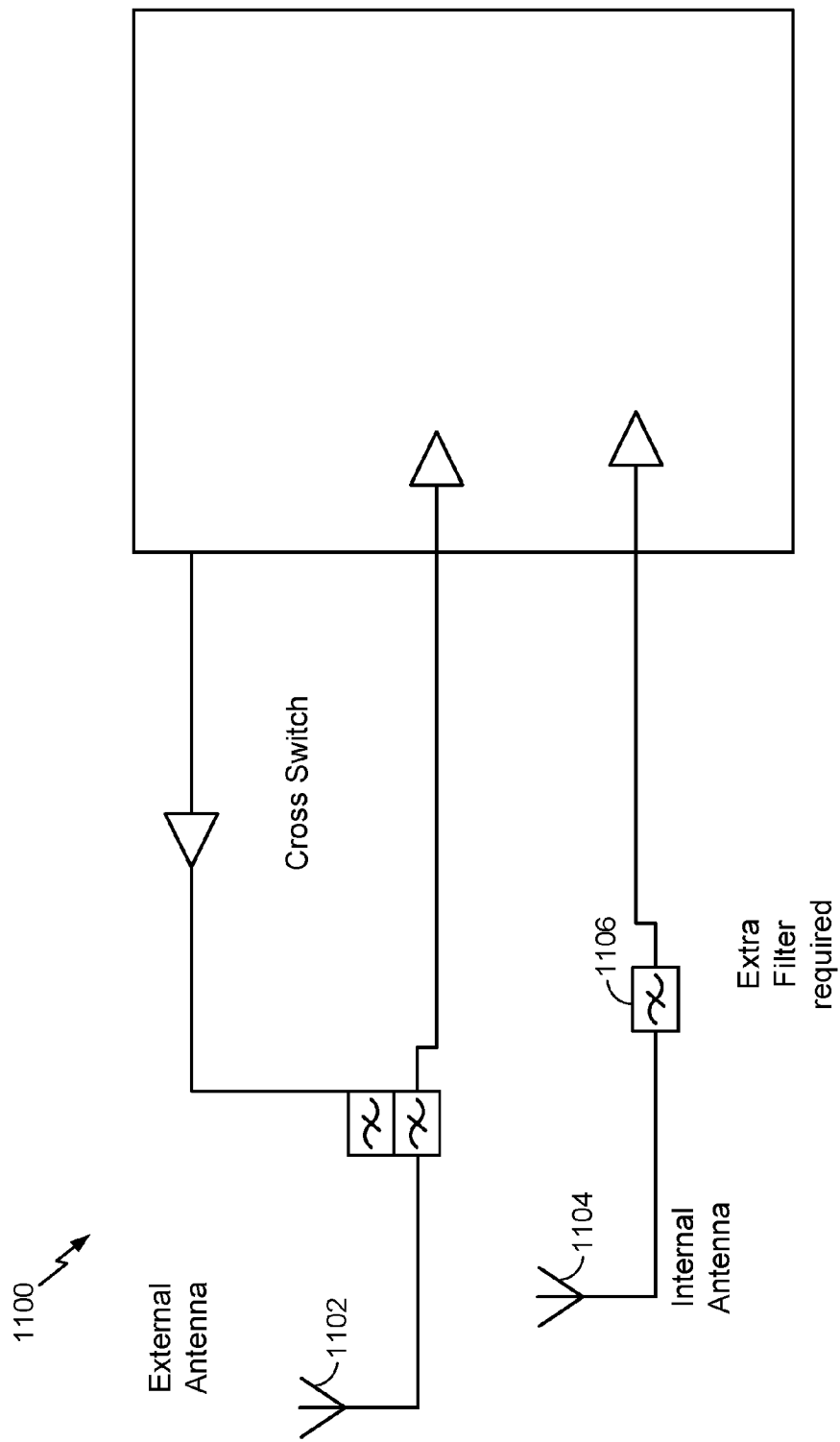
FIG. 11 is a block diagram illustrating at least one external antenna (e.g., a high-gain antenna) and at least one internal antenna available for measurement, in accordance with certain aspects of the present disclosure.

FIG. 11 is a block diagram illustrating both at least one external and at least one internal antenna available for measurement, in accordance with certain aspects of the present disclosure. In FIG. 11, a separate RF chain is used for the at least one external antenna 1102 and at least one internal antenna 1104. For this switching configuration, an additional receive filter 1106 may be used.

The techniques described above for adaptive configuration (e.g., antenna configuration via antenna switching), for example, for signal and/or mobility related measurements in vehicular devices having a high-gain antenna may allow for selective use of internal antennas to achieve improved performance (e.g., mobility performance). The techniques described above may apply to various types of antennas designs having various antenna gains, and that may be suitable to various types of vehicles and/or automobiles. The techniques may permit the device to take advantage of the extended coverage and/or demodulation of the high gain antenna(s) and/or the use of internal antenna(s) for reporting under certain conditions in order to improve performance (e.g., mobility performance).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for selecting, based on one or more conditions, a first measurement configuration that uses at least an external antenna mounted on a surface of a vehicle for one or more measurements or a second measurement configuration that uses at least an internal antenna for the one or more measurements may include the controller/processor 280 and/or any other component of the UE 120 illustrated in FIG. 120 and/or one or more components (e.g., cross switch 906, 1006) illustrated in FIGS. 9-11. The means for performing the one or more measurements using the selected measurement configuration may include the Controller/Processor 280, antenna(s) 252a-252r, MIMO Detector 256, Demodulator(s) 254a-254r, and/or Receive Processor 258 of the UE 120 illustrated in FIG. 2, for example. The means for sending a report based on the one or more measurements may include the Controller/Processor 280, Transmit Processor 264, TX MIMO Processor 266, Modulator(s) 254a-254r, and/or antenna(s) 252a-252r of the UE 120 illustrated in FIG. 2, for example.

In addition, means for deactivating, means for computing, and/or means for adjusting, may comprise a processing system, which may include one or more processors, such as the Controller/Processor 280, Receive Processor 258, and/or the Transmit Processor 264 of the UE 120 illustrated in FIG. 2, for example.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
   selecting, based on one or more conditions, a first measurement configuration that uses at least an external antenna mounted on a surface of a vehicle for one or more measurements of at least one of a serving cell or one or more neighboring cells or a second measurement configuration that uses at least an internal antenna associated with the vehicle for the one or more measurements;
   communicating with the serving cell via the external antenna regardless of which measurement configuration is selected;
   performing the one or more measurements according to the selected measurement configuration; and
   sending a measurement report based on the one or more measurements.

2. The method of claim 1, further comprising deactivating the internal antenna when selecting the first measurement configuration.

3. The method of claim 1, wherein the one or more measurements comprise at least one of: measurements related to measurement reporting for handover or idle measurements for cell reselection.

4. The method of claim 1, wherein the external antenna has a higher associated antenna gain relative to the internal antenna.

5. The method of claim 1, wherein:
   performing the one or more measurements comprises performing measurements with both the external antenna and the internal antenna; and
   the report comprises measurements only for common cells detected using both the internal antenna and the external antenna.

6. The method of claim 1, further comprising performing measurements of at least one parameter indicative of channel state with the external antenna regardless of which measurement configuration is selected.

7. The method of claim 1, wherein communicating with the serving cell via the external antenna comprises at least one of: sending uplink transmissions to the serving cell or performing downlink demodulation via the external antenna.

8. The method of claim 1, wherein the one or more conditions are based, at least in part, on a measured reference signal receive quality (RSRQ) of a serving cell.

9. The method of claim 8, wherein the selecting comprises:
   selecting the first measurement configuration if the RSRQ of the serving cell satisfies a threshold criteria.

10. The method of claim 8, wherein the selecting comprises:
    selecting the second measurement configuration if the RSRQ of the serving cell does not satisfy a threshold criteria.

11. The method of claim 1, wherein the one or more conditions are based, at least in part, on uplink transmission power or an uplink block error rate (BLER).

12. The method of claim 1, wherein the one or more conditions are based, at least in part, on a number of failed random access channel (RACH) attempts or presence of visited public land mobile network (VPLMN) cells in a search database.

13. The method of claim 1, further comprising:
    performing measurements with both the external antenna and the internal antenna;
    computing a difference between the measurements performed with the external antenna and the measurements performed with the internal antenna; and
    adjusting reported measurements according to an offset based, at least in part, on the difference.

14. The method of claim 13, wherein:
    the measurements performed with both the external antenna and the internal antenna are performed periodically; and
    the offset is updated after each periodic measurement.

15. An apparatus for wireless communications, comprising:

means for selecting, based on one or more conditions, a first measurement configuration that uses at least an external antenna mounted on a surface of a vehicle for one or more measurements of at least one of a serving cell or one or more neighboring cells or a second measurement configuration that uses at least an internal antenna associated with the vehicle for the one or more measurements;

means for communicating with the serving cell via the external antenna regardless of which measurement configuration is selected;

means for performing the one or more measurements according to the selected measurement configuration; and means for sending a measurement report based on the one or more measurements.

16. The apparatus of claim 15, wherein the external antenna has a higher associated antenna gain relative to the internal antenna.

17. The apparatus of claim 15, wherein the one or more conditions are based, at least in part, on a measured reference signal receive quality (RSRQ) of a serving cell.

18. The apparatus of claim 15, wherein the one or more conditions are based, at least in part, on uplink transmission power or an uplink block error rate (BLER).

19. The apparatus of claim 15, wherein the one or more conditions are based, at least in part, on a number of failed random access channel (RACH) attempts or presence of visited public land mobile network (VPLMN) cells in a search database.

20. An apparatus for wireless communications, comprising:
at least one processor configured to:
select, based on one or more conditions, a first measurement configuration that uses at least an external antenna mounted on a surface of a vehicle for one or more measurements of at least one of a serving cell or one or more neighboring cells or a second measurement configuration that uses at least an internal antenna associated with the vehicle for the one or more measurements;
communicate with the serving cell via the external antenna regardless of which measurement configuration is selected;
perform the one or more measurements according to the selected measurement configuration; and
output a measurement report for transmissions based on the one or more measurements; and
a memory coupled with the at least one processor.

21. The apparatus of claim 20, wherein the external antenna has a higher associated antenna gain relative to the internal antenna.

22. The apparatus of claim 20, wherein the one or more conditions are based, at least in part, on a measured reference signal receive quality (RSRQ) of a serving cell.

23. The apparatus of claim 20, wherein the one or more conditions are based, at least in part, on uplink transmission power or an uplink block error rate (BLER).

24. The apparatus of claim 20, wherein the one or more conditions are based, at least in part, on a number of failed random access channel (RACH) attempts or presence of visited public land mobile network (VPLMN) cells in a search database.

25. A non-transitory computer-readable medium having computer executable code stored thereon, comprising:
code for selecting, based on one or more conditions, a first measurement configuration that uses at least an external antenna mounted on a surface of a vehicle for one or more measurements of at least one of a serving cell or one or more neighboring cells or a second measurement configuration that uses at least an internal antenna associated with the vehicle for the one or more measurements;
code for communicating with the serving cell via the external antenna regardless of which measurement configuration is selected;
code for performing the one or more measurements according to the selected measurement configuration; and
code for sending a measurement report based on the one or more measurements.

26. The non-transitory computer-readable medium of claim 25, wherein the external antenna has a higher associated antenna gain relative to the internal antenna.

27. The non-transitory computer-readable medium of claim 25, wherein the one or more conditions are based, at least in part, on a measured reference signal receive quality (RSRQ) of a serving cell.

28. The non-transitory computer-readable medium of claim 25, wherein the one or more conditions are based, at least in part, on uplink transmission power or an uplink block error rate (BLER).

29. The non-transitory computer-readable medium of claim 25, wherein the one or more conditions are based, at least in part, on a number of failed random access channel (RACH) attempts or presence of visited public land mobile network (VPLMN) cells in a search database.

* * * * *